United States Patent
Takahashi

[19]
[11] Patent Number: 5,940,824
[45] Date of Patent: *Aug. 17, 1999

[54] INFORMATION PROCESSING APPARATUS AND METHOD

[75] Inventor: Koji Takahashi, Chigasaki, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/640,076

[22] Filed: Apr. 30, 1996

[30] Foreign Application Priority Data

May 1, 1995 [JP] Japan .................................... 7-107328

[51] Int. Cl.⁶ .................................................. G06F 17/30
[52] U.S. Cl. ................................................. 707/6; 369/48
[58] Field of Search ....................... 395/601, 611, 395/612; 348/219, 606, 416, 14, 17; 369/13, 48; 707/1–10, 100–104, 200–206

[56] References Cited

U.S. PATENT DOCUMENTS

| | | |
|---|---|---|
| 5,327,242 | 7/1994 | Naimpally et al. .................... 348/606 |
| 5,402,171 | 3/1995 | Tagami et al. ......................... 348/219 |
| 5,418,762 | 5/1995 | Kitayama ................................. 369/13 |
| 5,499,224 | 3/1996 | Sanada ..................................... 369/48 |
| 5,506,823 | 4/1996 | Sanada ..................................... 369/48 |
| 5,517,250 | 5/1996 | Hoogenboom et al. ................ 348/467 |

*Primary Examiner*—Thomas G. Black
*Assistant Examiner*—Ruay Lian Ho
*Attorney, Agent, or Firm*—Fitzpatrick, Cella, Harper & Scinto

[57] ABSTRACT

A plurality of compressed data obtained by information-compressing a plurality of data by a discrete cosine transform (DCT) are stored in a main image file. When a retrieval instruction is applied, data serving as a data retrieval key is extracted from an image database, and the extracted data is DCT-compressed by a compression processing unit. Using DC components of the resultant compressed data, reference data are generated. A search unit collates the reference data with the DC component data of the compressed data stored in the main image file and extracts data on the basis of this collation result. With this arrangement, in retrieving desired data from a plurality of data groups stored in the information-compressed state, data collation processing can be performed in the information-compressed state.

50 Claims, 12 Drawing Sheets

FIG. 7
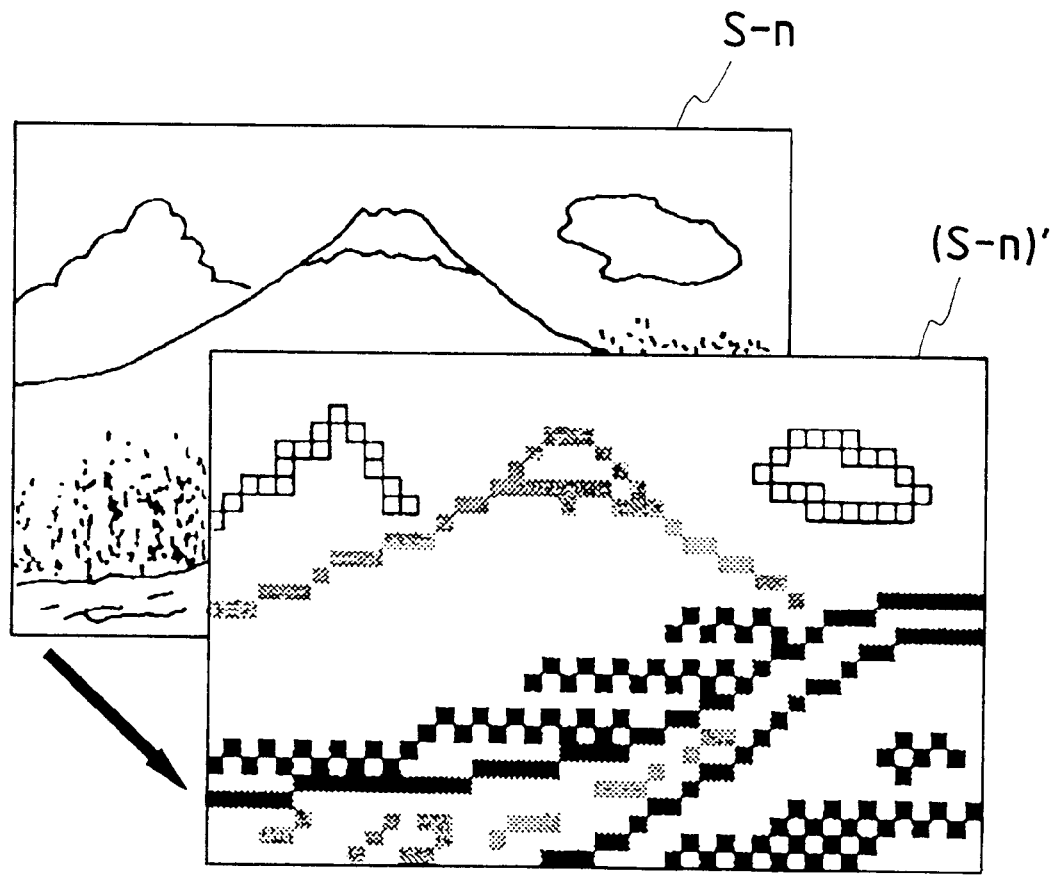
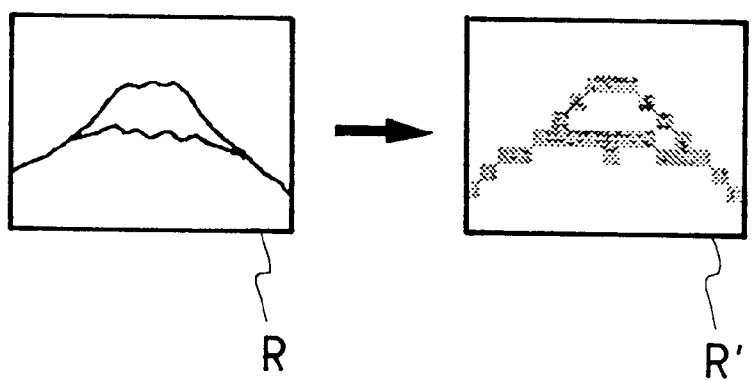

INFORMATION PROCESSING APPARATUS AND METHOD

BACKGROUND OF THE INVENTION

1. Field of the Invention

The present invention relates to an information processing apparatus and method for retrieving desired information from the stored information. More particularly, the present invention relates to an information processing apparatus and method suitable for retrieving desired information from information including image data, audio data, character data (e.g., fonts).

2. Related Background Art

A general information retrieval apparatus will be described with reference to an example for retrieving data from an image database. FIG. 13 is a block diagram showing the arrangement of a conventional image retrieval system. In this information retrieval apparatus, after an image is input, it is compressed (132). A language keyword is applied to the compressed data for each image (133), and the resultant data is stored in the storage (134). By this processing, the image database is created.

In retrieving image data, a desired retrieval class is used as a keyword, and the keyword is input as retrieval input information to a keyword retrieval process circuit. The range of image data is narrowed by a language keyword applied to each image in accordance with this retrieval input information (130). A group of image data (i.e., a group of compressed data) selected within a range limited to some extent in accordance with keyword retrieval are sequentially expanded and reproduced (131). Desired data is finally confirmed with visual observation.

For such an application purpose, a technique using progressive coding in the image compression process is available. In the reproduction mode, a progressive decoding process sequentially progresses from an image having a low resolution to an image having a high resolution. The currently displayed image can be switched to the next image when the user decides that the currently displayed image is not required. This technique is often used because a wasteful retrieval time can be eliminated.

The above image retrieval system has the following two problems.

(1) In either image retrieval technique, each image must be expanded during retrieval.

(2) In either image retrieval technique, visual confirmation is required except for a case using a language keyword.

These two problems become more conspicuous when a future database has a larger capacity, and access is made to a remote database.

Along with an advance in future networking, a user often has an opportunity to access distributed databases, thereby retrieving information. Image data must be transferred through a network due to the above problems. The large volume of data must be transferred through the network although the data are compressed.

SUMMARY OF THE INVENTION

The present invention has been made in consideration of the above problems, and has as its object to provide an information processing apparatus and method capable of executing data collation processing in an information-compressed state when desired data is retrieved from a plurality of data stored in the information-compressed state.

It is another object of the present invention to provide an information processing apparatus and method capable of executing data collation processing using some of compressed data to reduce the volume of data used in data retrieval when desired data is to be retrieved from a plurality of compressed data.

In order to achieve the above objects according to an aspect of the present invention, there is provided an information processing apparatus comprising:

storage means for storing a plurality of information-compressed data;

generation means for generating reference data on the basis of a data retrieval key; and extraction means for collating the reference data with each compressed data stored in the storage mans and extracting data on the basis of a collation result.

In order to achieve the above objects according to another aspect of the present invention, there is provided an information processing apparatus comprising:

storage means for storing a plurality of information-compressed data;

generation means for generating reference data on the basis of a data retrieval key;

extraction means for collating the reference data with data of all compressed data stored in the storage means, which belongs to a predetermined component range, and extracting data on the basis of a collation result; and control means for widening the predetermined component range to cause the generation means to generate new reference data, and causing the extraction means to extract, using the new reference data, data from the data extracted by the extraction means.

In order to achieve the above objects according to still another aspect of the present invention, there is provided an information processing apparatus comprising:

storage means for storing a plurality of information-compressed data;

holding means for holding retrieval keywords in a plurality of degrees of abstraction;

selection means selecting data serving as a data retrieval key on the basis of one of all the keywords held in the holding means, which has a predetermined degree of abstraction;

generation means for generating reference data using data of all compressed data, which belongs to the predetermined component range, all the compressed data being obtained by compressing the data selected by the selection means using the same technique as that of the compressed data stored in the storage means;

extraction means for collating the reference data with the data of all the compressed data stored in the storage means, which belongs to the predetermined component range, and extracting data on the basis of a collation result; and control means for using a keyword having a lower degree of abstraction as a keyword for use in the selection means, widening a component range in the generation means, and causing the selection means, the generation means, and the extraction means to process the data, as processing target data, extracted by the extraction means.

BRIEF DESCRIPTION OF THE DRAWINGS

FIG. 7 is a view showing the concept of an image obtained by extracting and reconstructing DC (Discrete Cosine) components from the retrieval reference image and the retrieval target image;

DETAILED DESCRIPTION OF THE PREFERRED EMBODIMENTS

The preferred embodiments of the present invention will be described below with reference to the accompanying drawings.

(a) First Embodiment

The first embodiment will exemplify automatic pattern collation processing using only "DC (Direct Current) components" of image data in image collation processing for an image database using DCT (Discrete Cosine Transform)-based compression coding of an orthogonal transform system.

Figure 1:
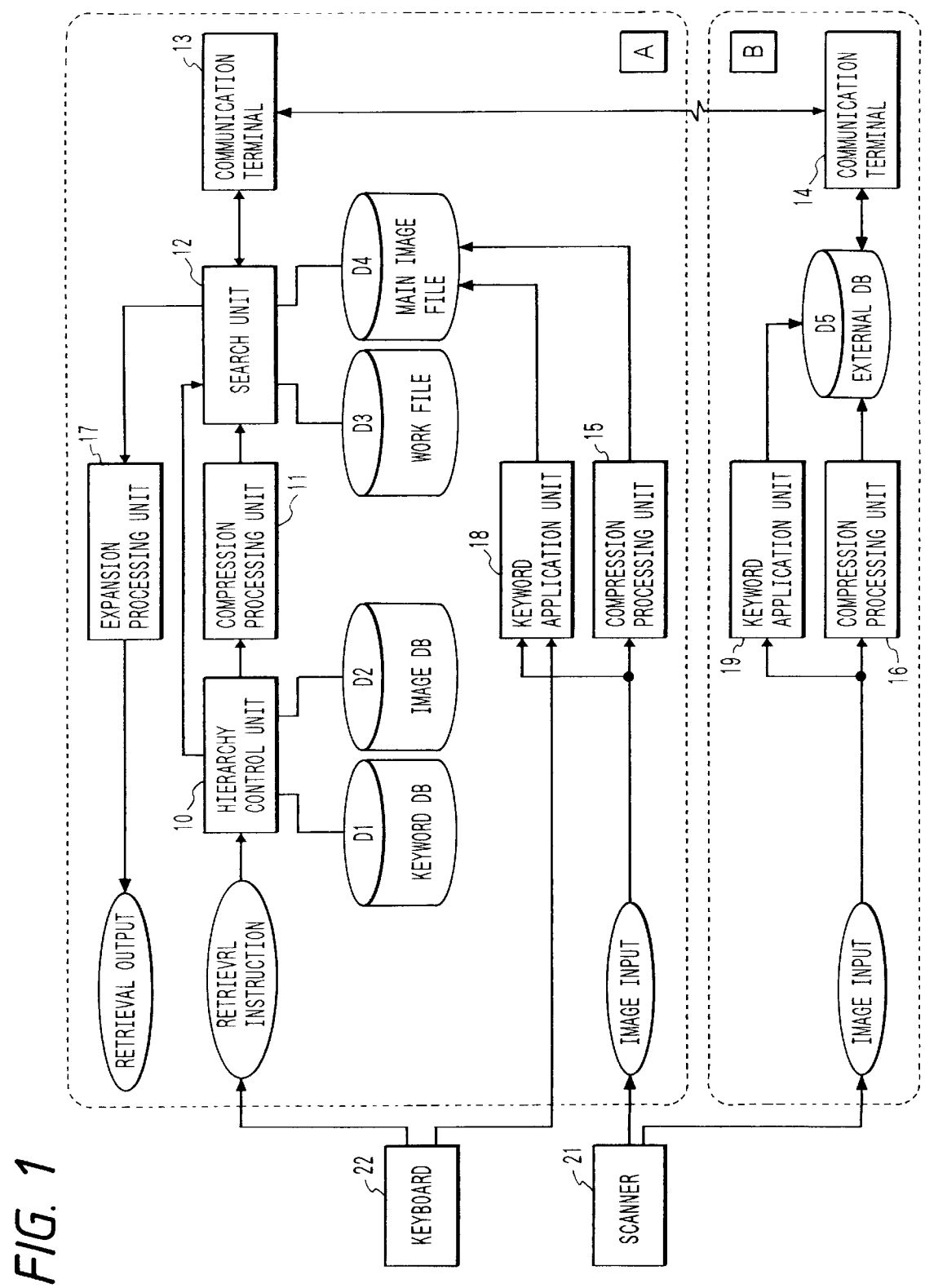
FIG. 1 is a block diagram showing the arrangement of an information retrieval system according to the first, second, and third embodiments.

FIG. 1 is a block diagram showing the arrangement of an information retrieval system according to the first embodiment. An information processing apparatus A and an information processing apparatus B can communicate with each other through communication terminals 13 and 14. In this embodiment, the information processing apparatus A has a function of inputting image data and creating a database (main image file D4) and a function of retrieving a desired image from this database. On the other hand, the information processing apparatus B has a function of inputting image data and creating an external database (DB) D5. The information processing apparatus A can retrieve image information stored in the external database D5 by communication between the communication terminals 13 and 14.

In the information processing apparatus A, image information input from a scanner 21 is compressed by a compression processing unit 15, and the compressed data is stored in the main image file D4, thereby creating a database. A keyword application unit 18 generates keyword data to apply a keyword to the input image data and stores the keyword data in correspondence with the input image data in the main image file D4. In this case, the pattern of the input image is recognized to automatically generate a keyword. Alternatively, a keyword is input from a keyboard 22. Note that the number of words constituting a keyword is variable, and a necessary number of words are generated for a keyword.

When a retrieval instruction is input from the keyword 22, a hierarchy control unit 10 selects a keyword from a keyword database D1, and a reference image corresponding to this keyword is generated from an image database D2. The reference image is compressed by a compression processing unit 11, and the compressed image is sent to a search unit 12. The search unit 12 extracts an image in advance from the main image file D4 on the basis of the keyword selected from the keyword database D1. The image extracted in advance is collated with the compressed reference image to perform further extraction.

An image finally extracted is expanded by an expansion processing unit 17, and the expanded image is output.

The communication terminal 13 is a terminal for receiving an image from the information processing apparatus B.

Reference symbol D3 denotes a work file for storing an image and data extracted by retrieval. More specifically, the work file D3 is used as a data buffer for not reading all data each time in a plurality of times of retrieval and checking only a flag of level "1" (a retrieval flag 33 in FIG. 2) representing a retrieval target from the second or subsequent retrieval. The work file D3 temporarily stores data obtained through a communication line to reduce the traffic on the communication line.

As described above, the database is created.

The information processing apparatus B also creates a database in the same manner as described above. More specifically, image data input from the scanner 21 is compressed by a compression processing unit 16, and the compressed data is stored in the external database D5. A keyword application unit 19 generates a keyword corresponding to the input image data and stores the keyword in correspondence with the input image data in the external database D5. The data in the external database D5 is transmitted to the information processing apparatus A through the communication terminal 14.

Figure 2:
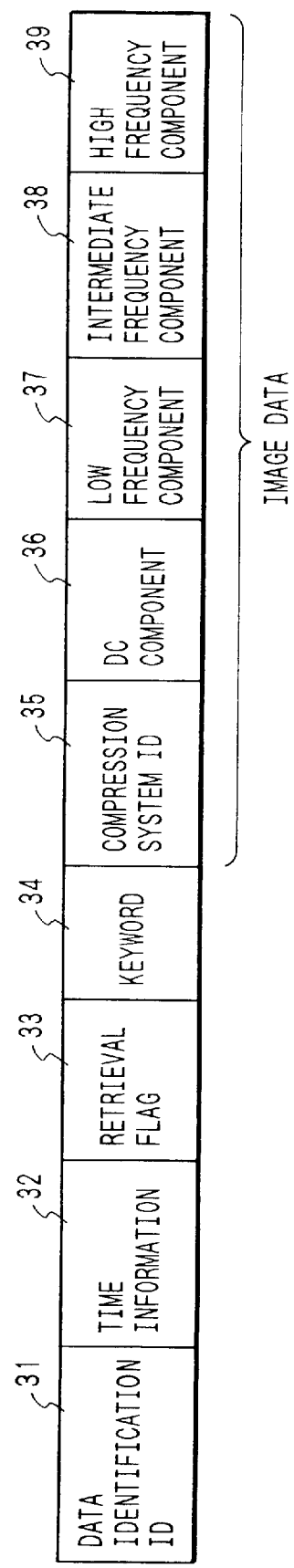
FIG. 2 is a view showing the structure of data registered in a database.

FIG. 2 is a view showing the structure of data registered in a database. As shown in FIG. 2, a data identification ID 31, time information 32, . . . , a high frequency component 39 are arranged from the start of the data. Management information serving as information for data management comprises the data identification ID 31 constituted by a serial number or the like, and the time information 32 such as the date of photography or date of image registration. The retrieval flag 33 is used to determine whether retrieved data is a retrieval target. When the retrieval flag 33 is set at "1", the retrieved data represents the retrieval target. When the retrieval flag 33 is set at "0", the retrieved data represents data except for the retrieval target. The keyword has about 20 digits/word or 16 bits/keyword using a correspondence code table. The number of words applied to the input retrieval data is preferably variable.

The remaining data are image data, i.e., a compression system ID 35, a DC component 36, a low frequency component 37, an intermediate frequency component 38, and the high frequency component 39. The compression system ID 35 is information for identifying the compression system of image data and stores compression standards, a compression ratio, an image structure, and the like. In the first embodiment, image data upon frequency range transform of the DCT scheme is divided into a DC component, a low frequency component, an intermediate component, and a high frequency component, which are respectively stored in the DC component 36, the low frequency component 37, the intermediate component 38, and the high frequency component 39.

Figure 3:
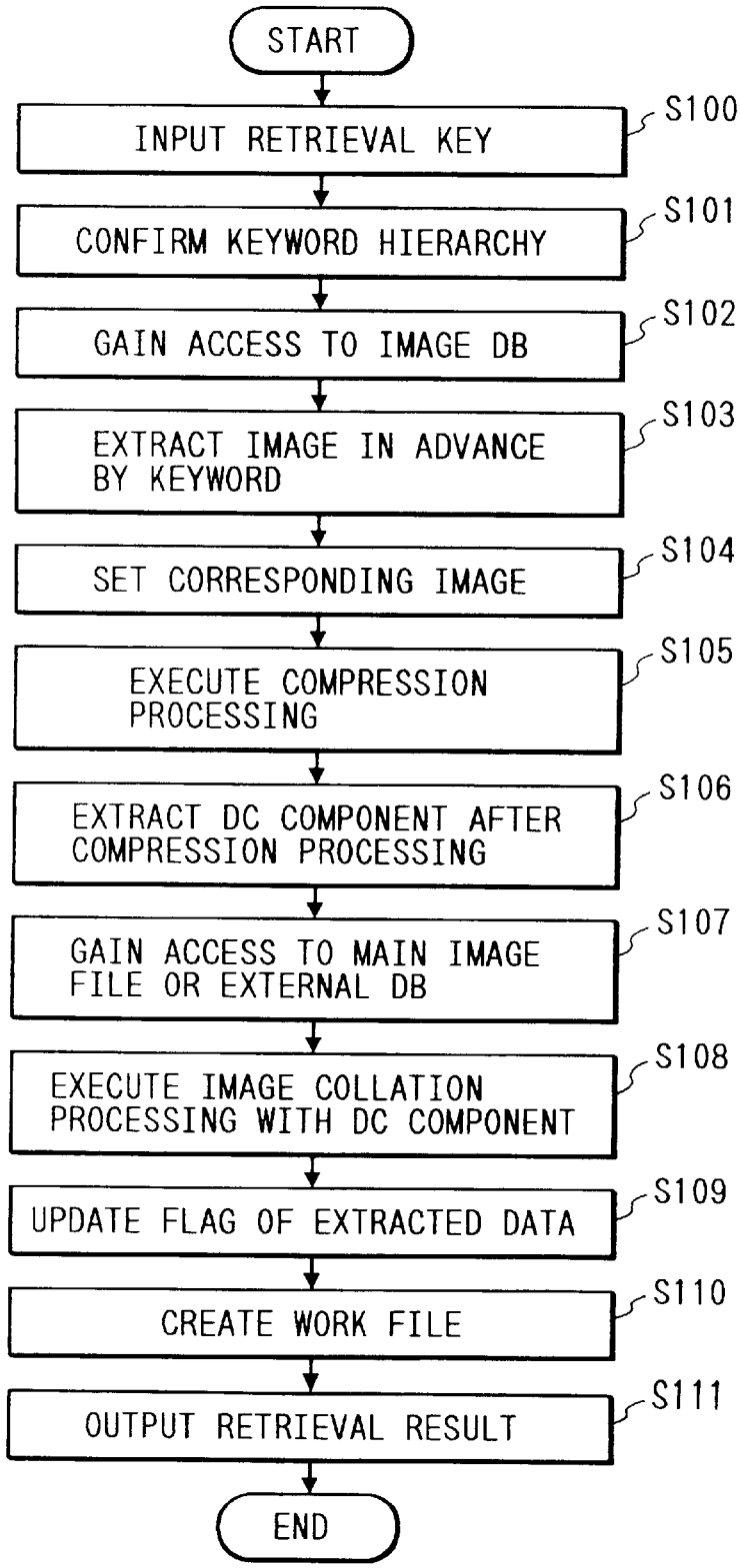
FIG. 3 is a flow chart showing an information retrieval sequence according to the first embodiment.

The operation of the first embodiment will be described with reference to FIGS. 1 to 4. FIG. 3 is a flow chart showing an information retrieval sequence of the first embodiment.

A retrieval instruction is input from the keyword 22 to a database system having the above structure (step S100). The retrieval instruction is often input in the form of a keyword, but time information such as an image formation date may be input in place of the keyword. A retrieval instruction using a keyword will be described below.

The retrieval instruction input from the keyboard 22 is input to a hierarchy control unit 10. The hierarchy control unit 10 outputs a retrieval reference image corresponding to the retrieval instruction from the image database D2 to the compression processing unit 11. In this case, the hierarchy control unit 10 acquires a keyword serving as a superordinate concept of the input keyword from the keyword database D1. The acquired keyword is sequentially updated from the superordinate concept to the subordinate concept and outputs the results to the search unit 12. The search unit 12 accesses the main image file D4 to retrieve an image using the keyword input from the hierarchy control unit 10, thereby extracting the image in advance (steps S101, S102, and S103). The retrieval flag 33 of the data retrieved from the database (main image file D4) using the keyword is set to "1".

Upon completion of image extraction using the keyword as described above, if further retrieval is required, retrieval of image data (compressed data) using the data whose retrieval flag 33 is set at "1" is performed.

The hierarchy control unit 10 acquires a keyword of subordinate concept lower than one level than the hierarchy position of the keyword updated at this moment. The reference image is extracted from the image database D2 on the basis of this keyword, and the extracted image is output to the compression processing unit 11. The compression processing unit 11 compresses the input reference image (DCT in this embodiment) in accordance with the compression system ID of the retrieved data (steps S104 and S105). The search unit 12 extracts its DC component and collates the extracted DC component with the DC component of each image data which has the retrieval flag 33 of "1" and stored in the main image file D4 (steps S106 to S108). The retrieval flag 33 of each image data is updated in accordance with a retrieval result, a work file is formed, and the retrieval result is output (steps S109 to S111).

In the above arrangement, the reference image is compressed by the compression processing unit 11. However, when a compression scheme used in the system is determined as, e.g., DCT and the reference image data stored in the image database D2 is also DCT-compressed in advance, the compression processing unit 11 and step S105 can be omitted, thereby simplifying the arrangement and shortening the processing time.

Figure 4:
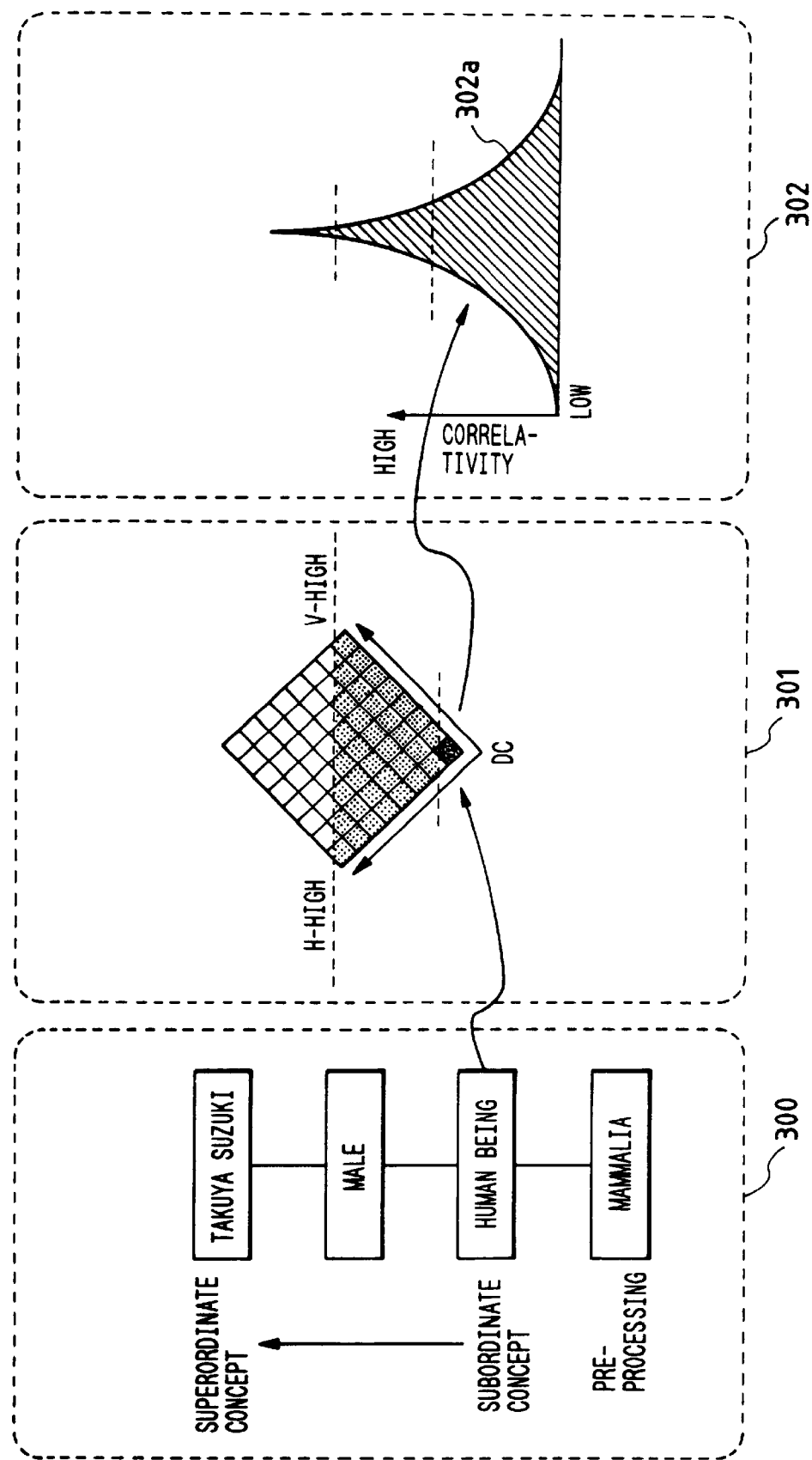
FIG. 4 is a view showing the concept of retrieval processing according to the first embodiment.

The first embodiment will be described in more detail below. FIG. 4 shows the concept of retrieval processing according to the first embodiment. FIG. 4 shows the illustrative hierarchical expression in which a retrieval keyword hierarchy (retrieval keyword 300), an image information structure (information-compressed state 301) in the database, and a change (retrieval target data group 302) in the number of retrieval target data in executing extraction processing a plurality of times are caused to correspond to each other.

Referring to FIG. 4, the hierarchical expression of a keyword is represented by the retrieval keyword 300. For example, to extract "Takuya Suzuki" from the image database, when a keyword of "Takuya Suzuki" is input, hierarchy determination processing of the hierarchy control unit extracts "male" as the superordinate concept of "Takuya Suzuki" and "human being" as a higher superordinate concept from the keyword database D1 serving as the knowledge database. "Mammalia", "animal", and "living thing" as higher superordinate concepts of "human being" are retrieved as keywords.

Note that a superordinate concept having a higher degree of abstraction is called a "lower order hierarchy", and a subordinate concept having a lower degree of abstraction is called a "higher order hierarchy". The high and low order hierarchies match the high and low frequencies.

The concept of a relationship between the frequency range used in retrieval collation processing of image-compressed data and a decrease in the number of retrieval target data is shown in the retrieval target data group 302. If highly accurate extraction processing which cannot narrow the retrieval range using only a keyword applied to the image information is required, a keyword of higher order than that of the keyword applied to the image data stored in the main image file D4 is selected from the keyword database D1, and extraction processing using image collation between image information in the image database D2 corresponding to the keyword and the image information in the main image file D4 is executed. For example, when keywords in image information represent "living thing" to "mammalia", data extraction of group "human being" as the next higher order concept relies on image collation.

As described above, data are extracted in advance using a keyword ("living thing"→"mammalia" in this case) applied to the image information in the database (step S103), and the desired data is then extracted from the database. The extracted data are collated using the DC components of the compressed data. In this embodiment, image collation processing is performed using only the DC components of the reference image corresponding to keyword "human being". Reference numeral 302a denotes a matching degree distribution of the data extracted using the keyword with reference to the reference image.

When the collation processing keyword of lower order is set as "human being" in the hierarchy control unit 10, a standard "human being" image is read out from the reference image database D2 (step S104). Similar compression processing is executed in accordance with an image processing method (compression system ID 35) defined in the database to generate collation work reference image data (step S105). Only the frequency components (DC components in this case) used in collation processing are extracted from the reference image data to generate real operation reference image data (key image data) (step S106). Collation processing is executed using the compressed data (key image data) consisting of only the DC components and the DC components in the retrieval target data (image data extracted in keyword retrieval) (steps S107 and S108).

The image data to be extracted in collation processing is image data having a matching degree higher than a predetermined value in the distribution 302a. As a result of collation processing, the retrieval flag 33 is set at "1" for the extracted image data. The retrieval flag 33 is set at "0" for non-extracted image data (step S109). In this manner, the image data extracted in collation processing is expanded by the expansion processing unit 17 and output as the retrieval result (step S111).

As described above, according to the first embodiment, the image data extracted in the extraction operation using keyword retrieval are collated using the DC components and are extracted. For this reason, the data used in image collation processing are only the DC components of the compressed data. The volume of data can be reduced, and processing speed can increase. In this manner, the extracted image data is expanded and output (displayed) for the first time.

Note that the above description is concerned with retrieval processing completed within the information processing apparatus A surrounded by the dotted line. It is possible to access the external database D5 distributively managed by the information processing apparatus B. This will be described below.

Processing of a system including the information processing apparatus B is different from processing completed within the information processing apparatus A in that the search unit 12 does not access the main image file D4, but the external database D5 through the communication terminals 13 and 14. The search unit 12 is connected to the network through the communication terminal 13 of the information processing apparatus A. The search unit 12 then accesses the external database D5 through the communication terminal 14 of the information processing apparatus B. At this time, in the first embodiment, image data is not expanded or developed, and only the data of the DC components are transferred onto the network. For this reason, the volume of data transferred on the network can be greatly reduced, and operation efficiency can be greatly improved, as a matter of course. When transfer data is temporarily stored in the work file D3, the data communication frequency can be reduced. Access to the external database in step S107 is achieved, as described above.

Figure 5:
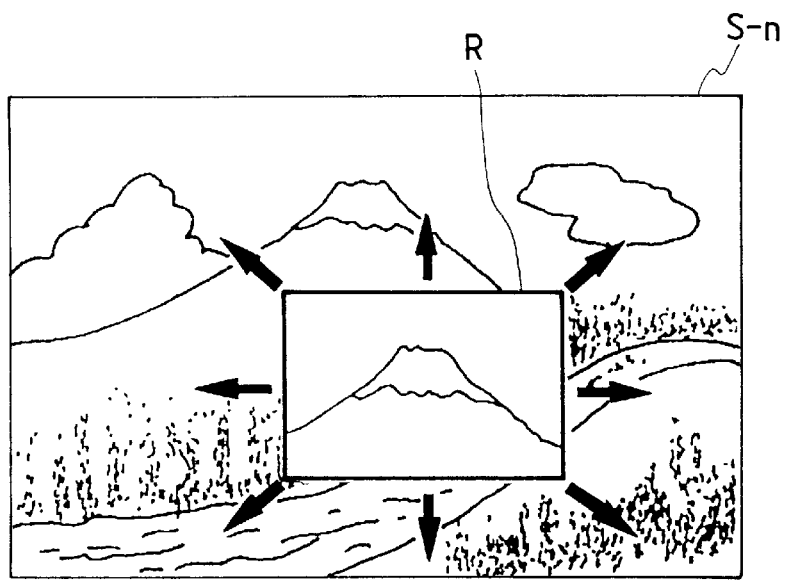
FIG. 5 is a view showing a retrieval target image and a reference image.
Figure 6:
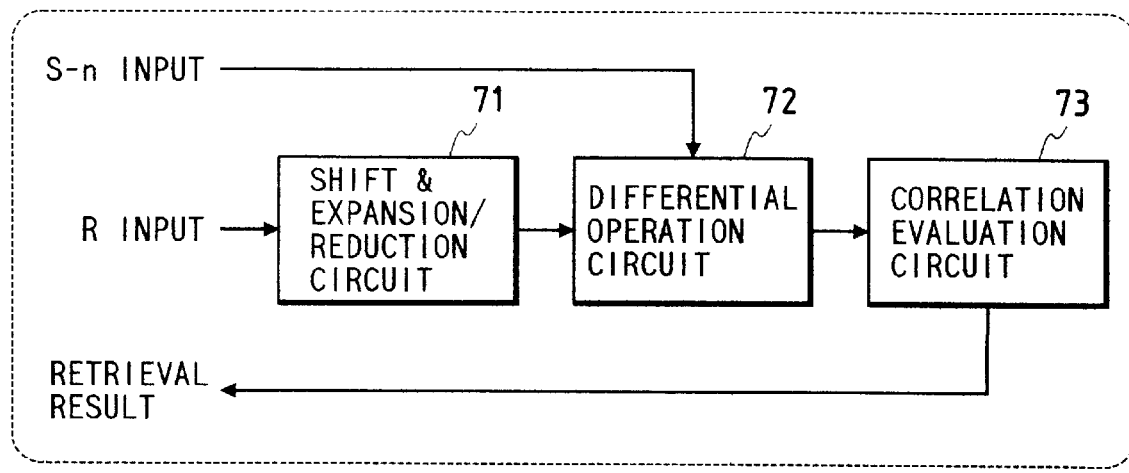
FIG. 6 is a block diagram showing the detailed arrangement of a search unit 12.

Search processing in the search unit 12 will be described in detail with reference to FIGS. 5 and 6. FIG. 5 is a view showing a retrieval target image and a reference image. FIG. 6 is a block diagram showing the detailed arrangement of the search unit 12.

The search unit 12 shifts the relative position of the retrieval target image (S-1, S-2, . . . , S-n) with respect to a retrieval reference image R which is constituted by a plurality of pixel blocks and corresponds to the retrieval keyword.

The reference image R input and set by the keyword is subjected to matching in relative position with respect to the retrieval target image and size with respect to the main image in a shift & expansion/reduction circuit 71. This processing result and the retrieval target image S-n are input to a differential operation circuit 72. The differential operation circuit 72 calculates an integral value of differences between the image data. A correlation evaluation circuit 73 evaluates the magnitude of this integral value to determine the presence/absence of a correlation. As a result, a retrieval target image having a higher correlation is output as a retrieval result. This correlation determination processing is performed for all retrieval targets (in this case, images extracted in keyword retrieval) using a variable as n.

Data corresponding to the retrieval target image and the reference image are only DC components of the compressed data of the image in the first embodiment. More specifically, data of 8 (horizontal)×8 (vertical) pixels of the reference image is transformed into frequency coordinates by DCT, and only the DC components are extracted.

The data consisting of only the DC components corresponds to image data obtained by reducing the original image into 1/64 although inverse DCT transform is not performed. For this reason, the data must be appropriately expanded (or sometimes reduced) by the shift & expansion/reduction circuit so as to match the target image in correlation detection processing. The compressed data can be subjected to image collation processing without inversely DCT-transforming the compressed data.

FIG. 7 is a view showing the concept of an image obtained by extracting and reconstructing only DC components from the retrieval reference image R and the retrieval target image S-n. A DC component image is used in pattern matching for the above correlation detection. In this case, the DC component of the retrieval reference image R is R', and the DC component of the retrieval target image S-n is (S-n)'.

Figure 8:
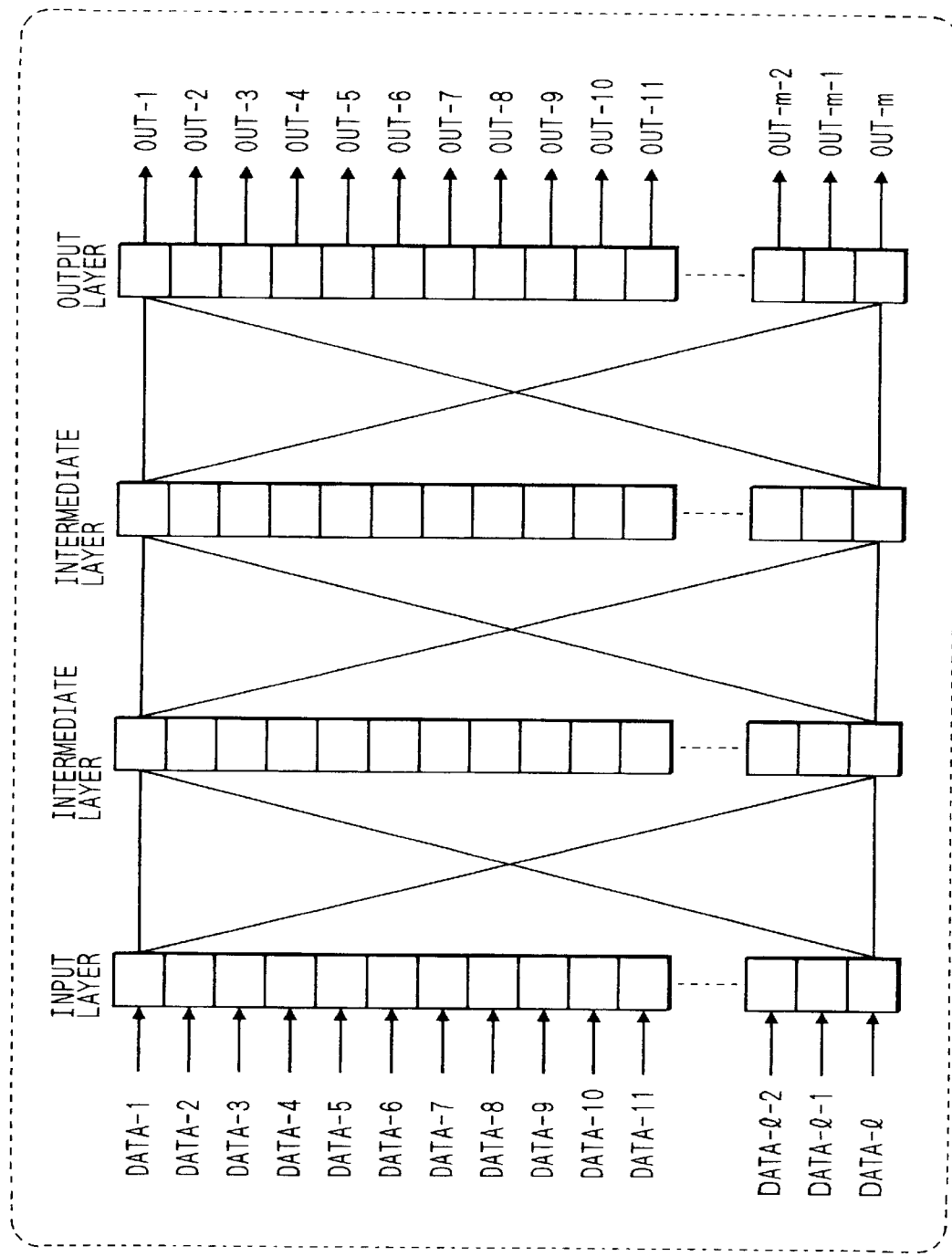
FIG. 8 is a block diagram showing the arrangement for executing image collation using a neural network.

FIG. 8 is a block diagram showing the arrangement for collating images using a neural network. The retrieval target image S-n is reconstructed using only the DC components (see FIG. 7). Of all the reconstructed image data, l data are input to the input layer of the neural network. M identification results are output as a search result through intermediate layer 1 and intermediate layer 2.

l is the number of parameters required in identification processing, and m is set in accordance with the resolution of the identification result. For example, if a reference image of 64 (horizontal)×64 (vertical) pixels is used, and each pixel is used as one data, then l=4,096. When the output layers can be classified to correspond to several keywords, the number of output layers can be the number equivalent to the number of keywords. When individual input images must be perfectly identified, the number of outputs must be equal to the number of inputs (i.e., m=l Weighting coefficients set for each path connecting the input layer and intermediate layer 1, each path connecting intermediate layers 1 and 2, and each path connecting intermediate layer 2 and the output layer of this hierarchical neural network are determined by learning such that learning data (see FIG. 7) obtained by extracting and reconstructing the DC components from the reference image in processing as described above are used to converge values to some extent.

Note that input data may be a luminance value or color information in each predetermined area or preprocessed data such as a difference between the luminance values or the pieces of color information in place of the raw data of the pixels.

The learning data may be an image reconstructed by inversely transforming data partially extracted in units of frequencies as needed in place of original sampling data or the data consisting of only the DC components.

Alternatively, a plurality of learned coefficient table corresponding to a plurality of frequency components may be prepared.

As described above, according to the first embodiment, since image extraction processing is executed using information of a specific frequency component, the operation volume can be small. In particular, in processing using only the DC components, the operation volume can be greatly reduced. Even if a database is to be accessed through a network or the like, the data transfer amount on the network can be greatly reduced. In addition, since most of a variety of international image compression standards include DC components, various image data can be retrieved.

For example, a high-speed search mode constituted by DC component data called D-pictures is defined in MPEG (Moving Picture Coding Experts Group) as a kind of moving picture compression scheme. This image data as a retrieval target can be retrieved with a high efficiency.

(b) Second Embodiment

Multi-stage retrieval for executing automatic pattern collation processing several times to meet the required accuracy using a DCT-based MPEG in compression coding will be described below. The system configuration of the second embodiment is the same as that of the first embodiment (FIGS. 1 and 2), and a detailed description thereof will be omitted.

Figure 9:
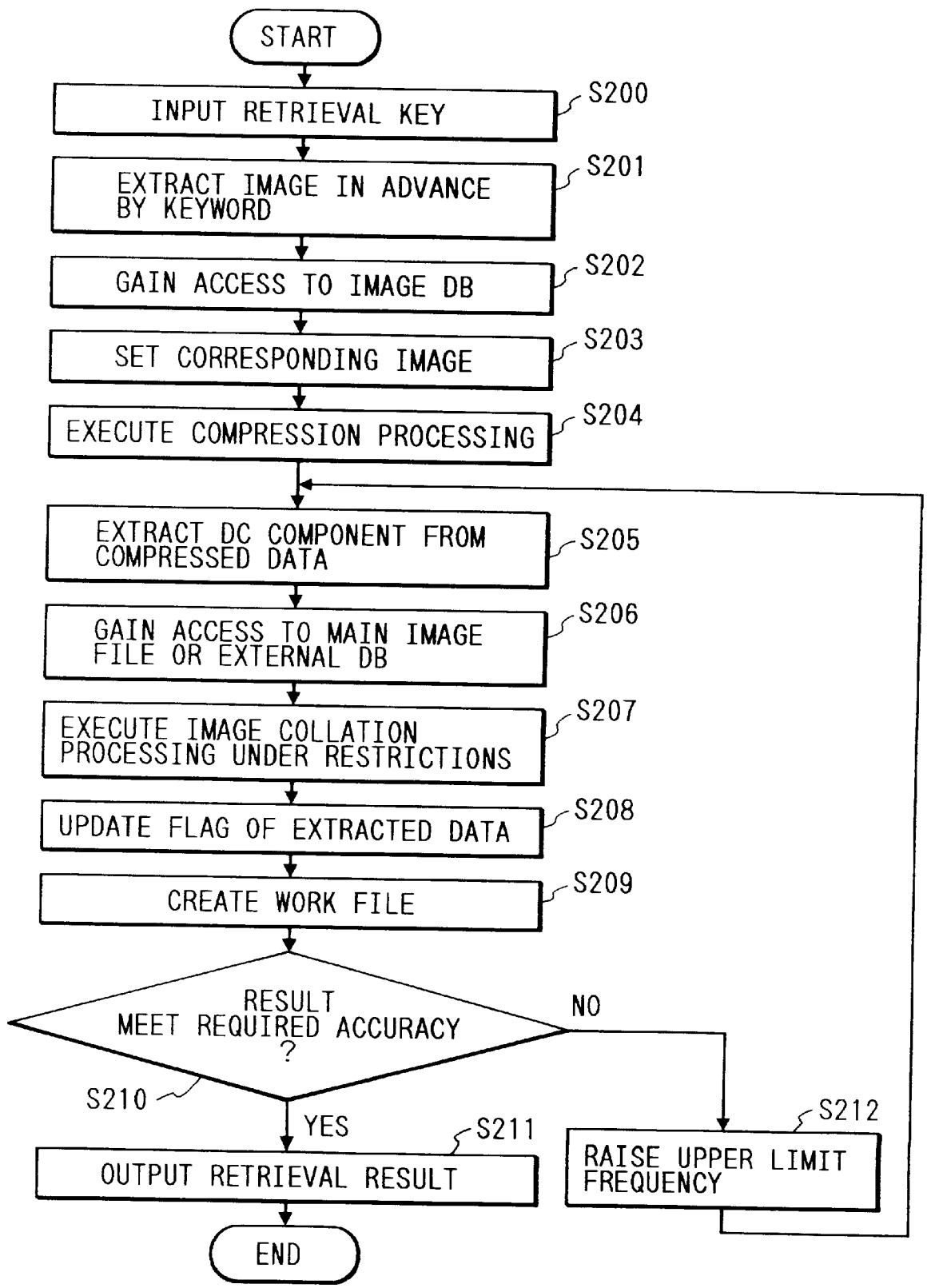
FIG. 9 is a flow chart showing a retrieval processing sequence according to the second embodiment.
Figure 10:
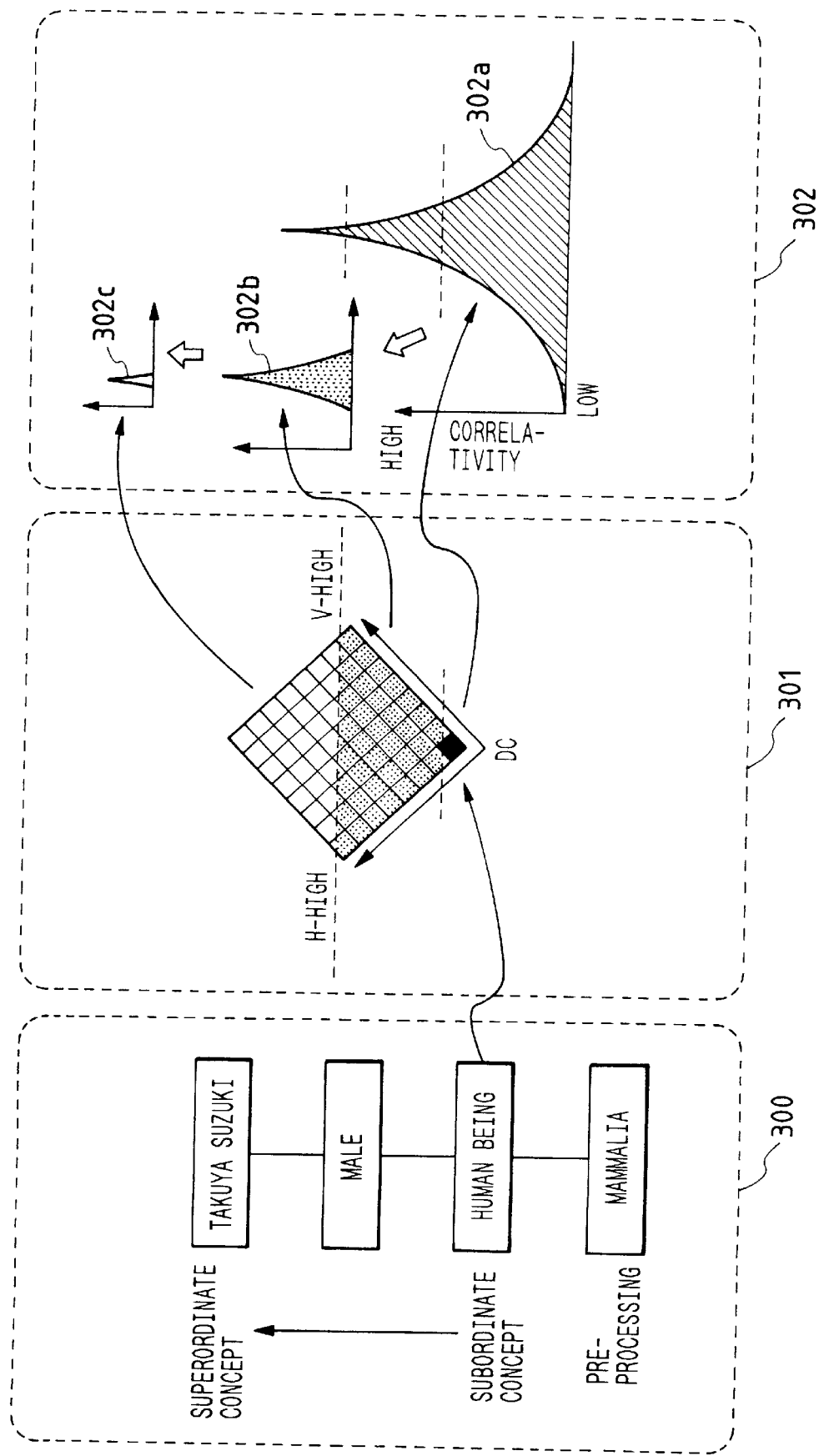
FIG. 10 is a view showing the concept of retrieval processing according to the second embodiment.

The operation of the second embodiment will be described with reference to FIGS. 9 and 10. FIG. 9 is a flow chart showing a retrieval processing sequence according to the second embodiment, and FIG. 10 is a view showing the concept of retrieval processing according to the second embodiment.

In step S200, a retrieval keyword is input from a keyboard 22. A hierarchy control unit 10 extracts a keyword representing the superordinate concept of the input keyword from a keyword database D1. Data is retrieved from a main image file D4 using this keyword representing the superordinate concept, thereby extracting image data in advance (S201). A retrieval flag 33 of the data extracted in advance is set at "1". An image database D2 is retrieved by a keyword representing a subordinate concept lower by one level than the keyword used in the extraction of data in advance (step S202), and a reference image serving as a key is extracted (step S203). Predetermined compression processing of this reference image is performed, and the compression result is held (step S204).

The above processing operations are almost the same as in steps S100 to S105 of the first embodiment. Although some of the compressed data obtained by compressing the reference image are held (e.g., DC components are held in DCT transform) in the first embodiment, all the compressed data obtained by compressing the reference image are held in the second embodiment. In this case, the DCT transform is used to classify the compressed data of the reference image into a DC component, a low frequency component, an intermediate component, and a high frequency component.

The second embodiment will exemplify a three-stage extraction operation. In the first extraction operation, collation processing using DC components is executed to extract data for the first time. In step S205, DC components are extracted from the compressed data of a reference image. In step S206, DC components of retrieval target image data (compressed data each of which has a retrieval flag of "1" in extracting data in advance) in the main image file D4 are extracted. In step S207, the DC components of the reference image and the retrieval target image are collated to retrieve an image. As a result of retrieval processing, a matching distribution like an image data group 302a (FIG. 10) is obtained. The retrieval flag 33 of image data having a matching degree exceeding a predetermined value is set at "1", and the retrieval flags of other image data are set at "0" (step S208). In this manner, the extracted image data is stored in a work file D3 (step S209).

The number of retrieval operations in this first extraction processing is represented by an image data group 302b in FIG. 10. It is then determined whether the first retrieval result meets the required accuracy (S210). If YES in step S210, the flow advances to step S211; otherwise, the flow advances to step S212. In this case, a criterion for the required accuracy is the number of extracted data. That is, when the number of extracted data falls within a predetermined number, the first retrieval result meets the required accuracy. If not, the upper limit frequency is raised in step S212 (in this embodiment, components up to the low frequency component of compressed data are used). The flow returns to step S205 to start second extraction processing.

In the second extraction processing, retrieval processing is executed for the image data group 302a extracted in the first extraction processing. The data group 302a whose retrieval flag 33 is set at "1" in the first extraction processing is a retrieval target, and collation processing is performed using components up to a low frequency component 37 of the compressed data. As a result, a matching distribution as shown in the image data group 302b is obtained. As in the first extraction processing, data having a matching degree of a predetermined value or more is extracted, and its retrieval flag 33 is set at "1". Determination for retrieval result accuracy is performed. If a satisfactory result is obtained, retrieval processing is ended. However, if no satisfactory result is obtained, the third extraction processing is performed.

Note that the low frequency component 37 is used in the second extraction processing, and its technique is the same as in collation processing using the DC component. For example, if eight frequency component data up to the low frequency component are present, an image corresponds to $8/64 = 1/8$. Collation can be apparently performed in the same sequence as in the DC component.

In the third extraction processing, the image data group 302b extracted in the second extraction processing is subjected to extraction processing. The data used in collation processing are all compressed data including an intermediate frequency component 38 and a high frequency component 39. As a result of the third extraction processing, the range of image data group to be extracted is further narrowed to obtain an image data group 302c.

As described above, when extraction processing is repeated, the number of data in an image data group subjected to a retrieval target is reduced. The upper limit frequency of compressed data to be used is raised for the image data group whose number of data is reduced, and image collation processing can be executed using higher frequency data with a higher accuracy. In this case, the operation volume per image data increases, but the number of image data serving as the retrieval targets is reduced. Therefore, an increase in processing time can be prevented.

When collation processing is completed as described above, image expansion processing is started, and the extraction result is output (displayed).

As described above, according to the second embodiment, since only the DC components of the compressed data are used in the first collation processing, the data operation volume can be greatly reduced. Therefore, coarse data group extraction processing can be easily executed at high speed.

In the range narrowing processing as the second or subsequent extraction processing, since the number of retrieval target data is reduced, a longer processing time can be distributed to extraction processing which requires a higher accuracy. In this manner, in each stage of multi-stage extraction processing, processing is performed with a processing load corresponding to a required extraction accuracy. An easy-to-handle system free from variations in the response times and matching the sense of a user can be created.

(c) Third Embodiment

Hierarchical automatic pattern collation processing using a DCT-based MPEG in compression coding will be described below. The arrangement of the third embodiment is the same as that of the first embodiment (FIGS. 1 and 2).

Figure 11:
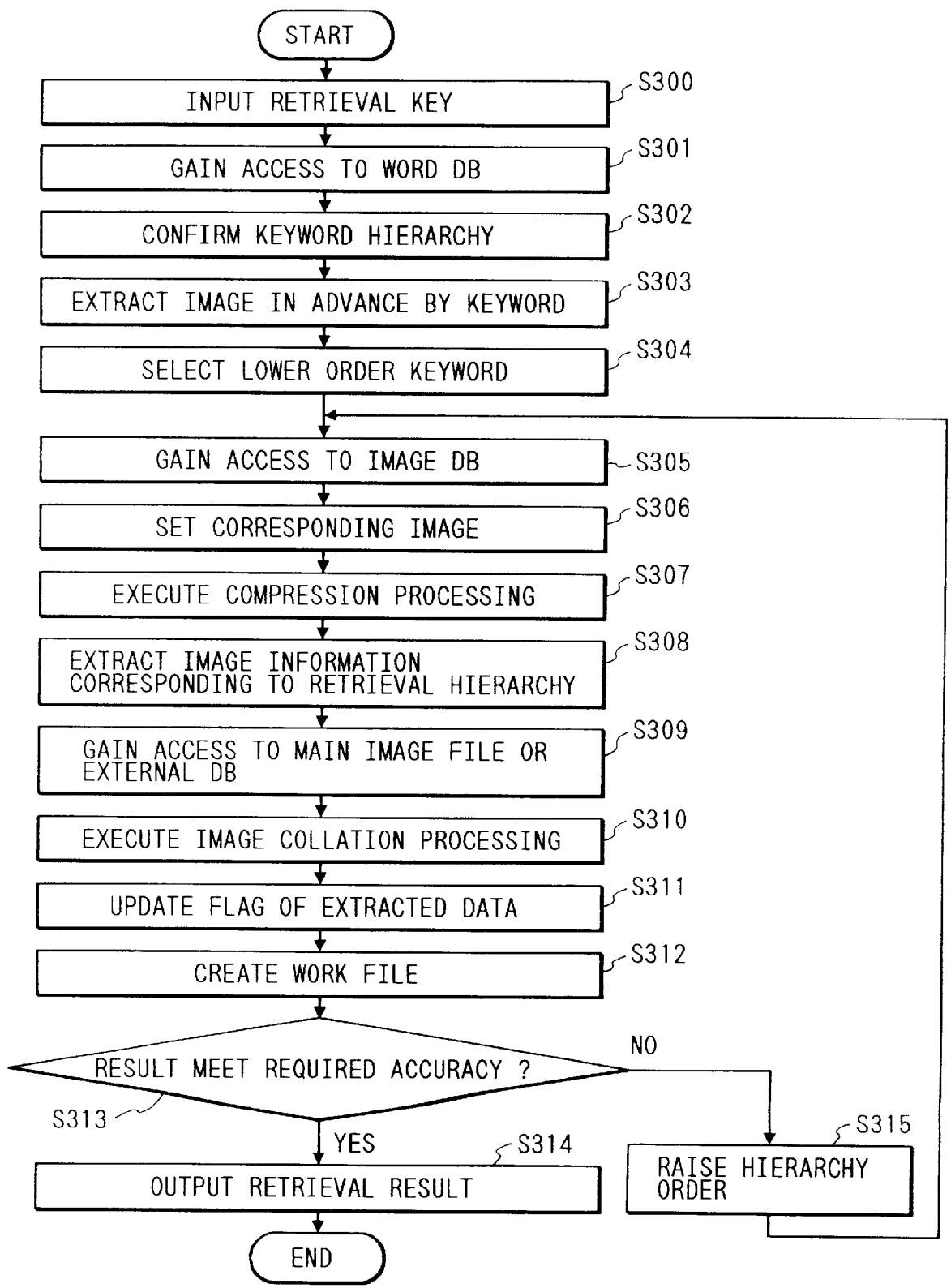
FIG. 11 is a flow chart showing a retrieval processing sequence according to the third embodiment.
Figure 12:
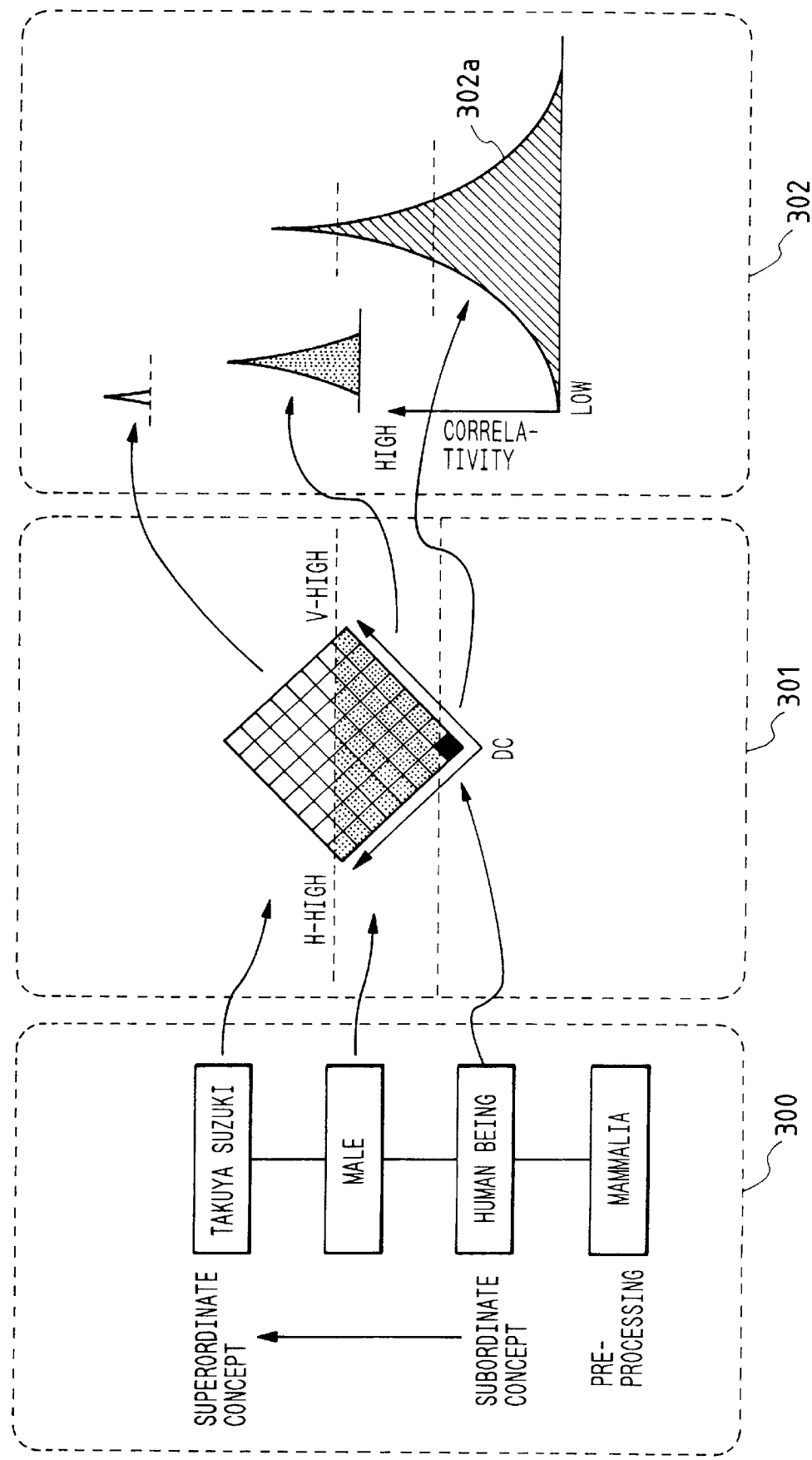
FIG. 12 is a view showing the concept of retrieval processing according to the third embodiment.
Figure 13:
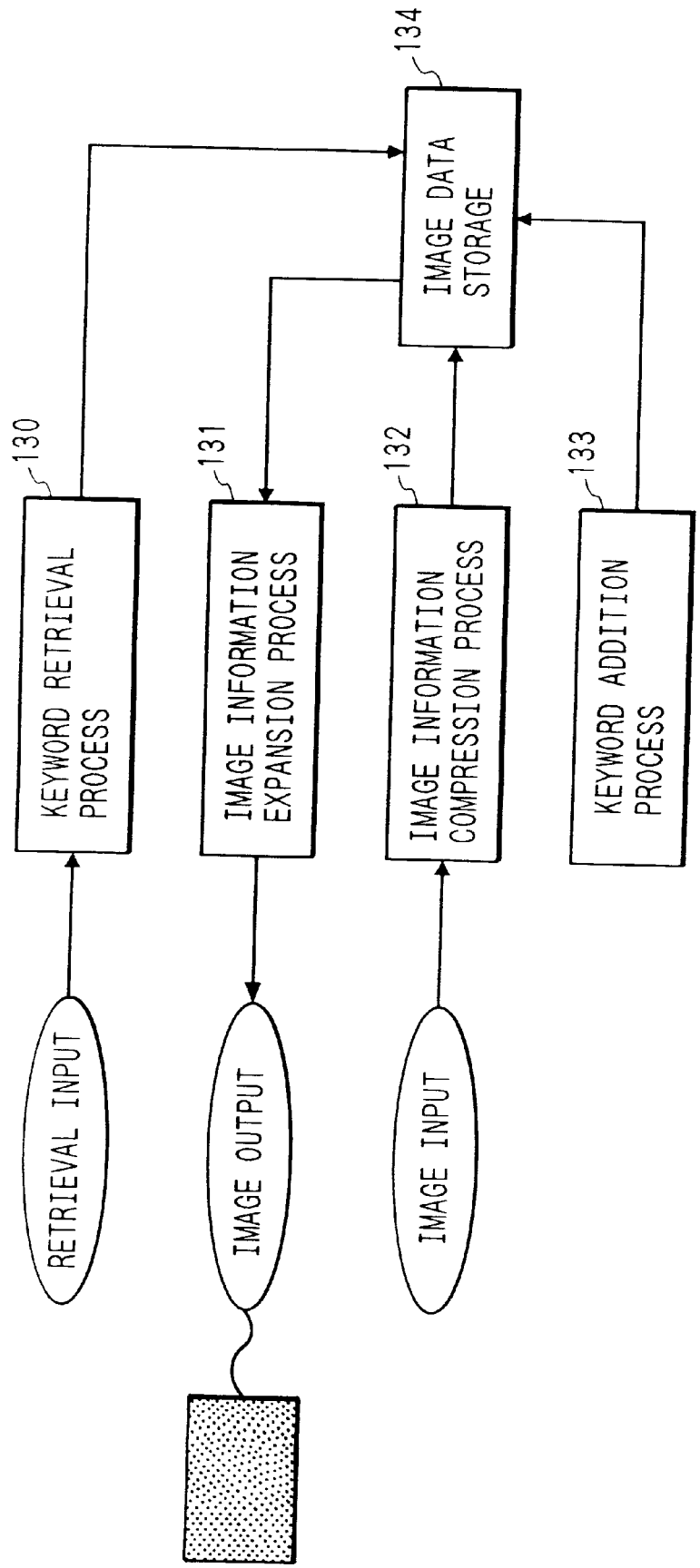
FIG. 13 is a block diagram showing the arrangement of a conventional image retrieval system.

In the third embodiment, extraction operations are executed in three hierarchical levels. In each hierarchical level, a data group with "retrieval flag=1" serves as a retrieval target, and recognition processing is executed. FIG. 11 is a flow chart showing a retrieval processing sequence according to the third embodiment. FIG. 12 is a view showing the concept of retrieval processing according to the third embodiment. Retrieval processing according to the third embodiment will be described below.

As in the first and second embodiments, the keywords of superordinate concepts of an input keyword are acquired, and the acquired keywords are hierarchically arranged. Retrieval is performed from a keyword of superordinate concept to a keyword of subordinate concept to extract data in advance (steps S300 to S303). A keyword is selected to start retrieval processing. In the first retrieval processing, a low order keyword ("human being" in FIG. 12) is selected (step S304), and collation processing of DC components using this keyword is executed.

In steps S305 and S306, an image database D2 is accessed to extract a reference image corresponding to the selected keyword. In step S307, a compression processing unit 11 compresses the corresponding image selected in step S306. In step S308, compressed data is extracted in accordance with the hierarchy of the keyword. In the first retrieval processing, since the lower order keyword is used, only the DC components are extracted. In steps S309 and S310, the data extracted in advance from a main image file D4 are collated using their DC components. As a result of this collation processing, the data extracted in advance has a distribution like an image data group 302a, and image data having a matching degree of a predetermined value or more is extracted as extracted data (step S311).

The data extracted in step S311 is stored in a work file D3 (step S312). In step S313, as a result of the above extraction, it is determined whether the extracted data meet a required accuracy. If YES in step S312, the flow advances to step S314; otherwise, the flow advances to step S315. The required accuracy is represented by the number of extracted data.

As a result of extraction, when the extracted data do not meet the required accuracy, a keyword of the raised hierarchy order is selected in step S315, and the flow returns to step S305. As a result, in the second retrieval processing, a reference image corresponding to a retrieval keyword ("male" in FIG. 12) shifted to a higher order by one level is extracted from the image database D2, and compression processing as described above is executed. In collation processing from step S308 to step S310, components up to the low frequency component in the compressed data are used. Note that image data serving as retrieval targets are data each of which has a retrieval flag of "1" set in the first retrieval processing as in the second embodiment. As a result, image collation processing of higher order can be performed with a higher accuracy.

As described above, when the second extraction processing is completed, it is determined whether the extraction result meets the required accuracy. If not, the third retrieval processing is started. In the third retrieval processing, a higher order keyword, i.e., "Takuya Suzuki" is selected in step S315. A reference image corresponding to this keyword is extracted from the image database D2, and compression processing is executed in the same manner as described above. In collation processing from step S308 to step S310 in the third retrieval processing, the high frequency components (i.e., all compressed data) of the compressed data are used.

In the third retrieval processing, a data group with "retrieval flag=1" set in the pervious retrieval processing serves as a retrieval target. When the third retrieval processing is completed, the retrieval result must meet the required accuracy. The flow advances from step S313 to step S314. In this manner, when collation processing is ended, image expansion processing is executed, and the extraction result is output (displayed) for the first time.

As described above, according to the third embodiment, retrieval information of low order of all the hierarchically defined pieces of information is caused to correspond to the low frequency component of the compressed information, thereby greatly reducing the data operation volume in the first collation processing. In the first extraction processing, coarse data group extraction processing can be achieved by easy processing. Retrieval information of higher order is caused to correspond to information of higher frequency component. Therefore, a longer time can be distributed to the second or subsequent processing which requires a higher accuracy.

Information can be retrieved from any hierarchical level desired by the user, and a desired data group can be efficiently extracted.

Any scheme except for the MPEG can be used in compression coding. For example, coding used for waveform coding, such as pyramid coding whose coding structure is hierarchical, subband coding, arithmetic coding, fractal coding, or copy coding, and intelligent coding such as recognition coding using a pattern recognition technique in a compression process can be used with a higher compatibility.

In the second and third embodiments as in the first embodiment, when a compression method used in a system is determined in advance, and a reference image is compressed by this compression method and stored in the image database D2, compression processing of the reference image can be omitted, as a matter of course.

As described above, the first, second, and third embodiments have the following effects. That is, since a desired data group can be extracted without information expansion processing, the volume of data to be processed is reduced, and high-speed processing can be performed. The decrease in the volume of data to be processed reduces the load on the network in extraction processing including database on the network.

The operation volume can be small because extraction processing is executed using a specific frequency component. In particular, when only the DC components are used, the arithmetic operation volume can be greatly reduced. In addition, since most of a variety of international image compression standards include DC components, various image data can serve as retrieval targets. For example, a high-speed search mode constituted by DC component data called D-pictures is defined in MPEG (Moving Picture Coding Experts Group) as a kind of moving picture compression scheme. This image data as a retrieval target can be retrieved with a high efficiency.

Since the pieces of retrieval information which are hierarchically defined in a hierarchical coding data group are used, the conceptual retrieval sequence of a user matches the processing sequence of the system, and entire retrieval processing has no waste.

The extraction accuracy or extraction level can be selected, as needed, for the extraction processing result using retrieval information of low order in accordance with multi-stage extraction processing for executing extraction processing using retrieval information of higher order. Therefore, entire retrieval processing has no waste.

Since multi-stage extraction processing extracts frequency components of higher frequencies from the extraction processing result using low frequency components, the individual operation volumes in initial retrieval having a larger number of low frequency data (low order) of the target data group can be reduced. In retrieval of higher frequency (higher order) necessary for more detailed collation processing, the number of target data has been reduced, and as a result, the operation volumes of the respective retrieval hierarchy orders are averaged. That is, response times (responses) upon inputs of retrieval commands can be used without any variation, and the system operability can be improved. Since a large margin need not be included in load design of a CPU which performs data collation processing. Inexpensive elements having a capacity level lower by one level can be used. When a CPU is time-shared, a lot of processing operations can be executed during the free time.

Retrieval information of low order in the pieces of hierarchically defined retrieval information is caused to correspond to the low frequency component of the compressed information. For this reason, the data operation volume of the first collation processing can be greatly reduced. Coarse extraction processing of a data group can be completed by simple processing within a short period of time. Retrieval information of high order is caused to correspond to the high frequency component of the compressed information. For this reason, the second or subsequent collation processing can be executed with a high accuracy. Since the range of target data is narrowed by the first collation processing, a longer time can be distributed to the second or subsequent extraction processing which requires a higher accuracy.

The hierarchical shift of the retrieval keyword is synchronized with the shift of the upper limit frequency used in image processing to result in a synergic effect in which both hierarchical range narrowing of the keywords and image collation accuracy can be improved. The retrieval results can be acceleratedly improved when the number of times of retrieval increases.

In this manner, in each hierarchical order in multi-hierarchical extraction processing, processing is performed with an operation load (i.e., a response time) corresponding to the required extraction accuracy. Therefore, an easy-to-handle system meeting the sense of a user can be constructed.

Since retrieval processing of retrieval information from an arbitrary hierarchy order can be executed in accordance with a desired degree of abstraction of the user, a desired data group can be extracted with a high efficiency.

In general, users tend to have opportunities to access remote databases to execute information retrieval. According to the above embodiments, the users can perform automatic retrieval processing without executing expansion processing. In transmitting a retrieval result to a user through a transmission line, the result whose data range is narrowed is transmitted in the form of compressed data, thereby reducing the load on the communication path and shortening the transmission time. Therefore, the present invention can contribute to the improvement of efficiency of the overall retrieval operation.

Since the knowledge database associated with the retrieval keywords is stored in the hierarchical form, the relation up to the hierarchy order of the designated keyword can be confirmed. Information can be extracted in advance using only a keyword, the extraction load by image processing can be reduced, and total processing efficiency can be improved.

To obtain a higher extraction accuracy, which is disadvantageous in processing time, an extraction operation using image processing is performed for all hierarchy orders to which keywords are applied, and data not applied with a keyword can also be extracted, thereby improving the total retrieval accuracy.

Note that the present invention may be applicable to a system constituted by a plurality of equipments or an apparatus constituted by one equipment. The present invention is also applicable when a program is supplied to the system or apparatus to achieve the object.

As has been described above, according to the present invention, in retrieving desired data from a plurality of data groups stored in the information-compressed state, data collation can be performed in the information-compressed state.

According to the present invention, in retrieving desired data from the plurality of compressed data groups, data collation processing can be performed using some of the compressed data. Therefore, the data volume can be reduced in data retrieval.

What is claimed is:

1. An information processing apparatus comprising:
   storage means for storing a plurality of retrieval object pattern data;
   generation means for generating reference pattern data on the basis of a data retrieval key;
   pattern-matching means for pattern-matching between each of the plurality of retrieval object pattern data stored in said storage means and the reference pattern data; and
   extraction means for extracting the retrieval object pattern data matched with the reference pattern data by said pattern-matching means.

2. An apparatus according to claim 1, wherein the data stored in said storage means is compressed data obtained by deleting a redundancy component on the basis of a frequency component of the information and compressing an information volume of the data.

3. An apparatus according to claim 2, wherein the data stored in said storage means is data in which the information volume is compressed by a Discrete Cosine Transform.

4. An apparatus according to claim 2, wherein said pattern-matching means pattern-matches the reference pattern data with all the data stored in said storage means, which belongs to a predetermined component range, and said extraction means extracts data on the basis of a pattern-matching result.

5. An apparatus according to claim 4, wherein the predetermined component range is of Discrete Cosine components.

6. An apparatus according to claim 1, wherein said storage means adds a keyword to each data and stores the data with the keyword, and
   said apparatus further comprises pre-extraction means for narrowing a range of processing target data for said pattern-matching means in accordance with keyword retrieval based on an input keyword.

7. An apparatus according to claim 6, wherein said apparatus further comprises second generation means for generating a keyword of superordinate concept of the input keyword, and
   said pre-extraction processing means performs keyword retrieval on the basis of the keyword of superordinate concept generated by said second generation means and narrows the range of processing target data for said pattern-matching means.

8. An apparatus according to claim 1, wherein said generation means generates reference data corresponding to a keyword selected on the basis of the data retrieval key.

9. An information processing apparatus comprising:
   first storage means for storing a plurality of retrieval object pattern data;
   second storage means for storing a plurality of reference pattern data;
   first extraction means for extracting desired reference pattern data from said second storage means on the basis of a data retrieval key;
   compression means for compressing information of the reference pattern data extracted by said first extraction means;

pattern-matching means for pattern-matching between each of the plurality of retrieval object pattern data stored in said first storage means and the reference pattern data information-compressed by said compression means; and second extraction means for extracting the retrieval object pattern data matched with the reference pattern data by said pattern-matching means.

10. An information processing apparatus comprising:

first storage means for storing a plurality of information-compressed retrieval object pattern data;

second storage means for storing a plurality of reference pattern data information-compressed in a same scheme as that of the retrieval object pattern data stored in said first storage means;

first extraction means for extracting desired reference pattern data from said second storage means on the basis of a data retrieval key;

pattern-matching means for pattern-matching between each of the plurality of retrieval object pattern data stored in said first storage means and the reference pattern data extracted by said first extraction means; and second extraction means for extracting the retrieval object pattern data matched with the reference pattern data by said pattern-matching means.

11. An information processing apparatus comprising:

storage means for storing a plurality of information-compressed retrieval object pattern data;

first generation means for generating reference pattern data which belongs to a predetermined component range, on the basis of a data retrieval key;

first pattern-matching means for pattern-matching between each of the plurality of retrieval object pattern data stored in said storage means, which belongs to said predetermined component range, and the reference pattern data;

first extraction means for extracting the retrieval object pattern data matched with the reference pattern data by said first pattern-matching means;

widening means for widening said predetermined component range;

second generation means for generating new reference pattern data which belongs to the component range widened by said widening means;

second Pattern-matching means for pattern-matching between each of the retrieval object pattern data extracted by said first extraction means which belongs to said widened component range and the new reference pattern data; and second extraction means for extracting the retrieval object pattern data matched with the new reference pattern data by said second pattern-matching means.

12. An apparatus according to claim 11, further comprising decision means for determining whether data extraction by said first extraction means is executed with a desired accuracy, and deciding on the basis of a determination result whether said second generation means and said second extraction means execute operations.

13. An apparatus according to claim 11, wherein the data stored in said storage means is compressed data obtained by deleting a redundancy component on the basis of a frequency component of the information and compressing an information volume of the data, and said widening means widens said component range from a Discrete Cosine component to a high frequency component.

14. An information processing apparatus comprising:

storage means for storing a plurality of information-compressed retrieval object pattern data;

holding means for holding retrieval keywords in a plurality of degrees of abstraction;

selection means for selecting data serving as a data retrieval key on the basis of one of all the keywords held in said holding means, which has a predetermined degree of abstraction;

generation means for generating reference pattern data using data of all compressed data, which belongs to the predetermined component range, all the compressed data being obtained by compressing the data selected by said selection means using a same technique as that of the compressed data stored in said storage means;

pattern-matching means for pattern-matching between each of the retrieval object pattern data stored in said storage means, which belongs to the predetermined component range, and the reference pattern data;

extraction means for extracting the retrieval object pattern data matched with the reference pattern data; and control means for using a keyword having a lower degree of abstraction as a keyword for use in said selection means, widening a component range in said generation means, and causing said selection means, said generation means, and said extraction means to process the retrieval object pattern data, as processing target data, extracted by said extraction means.

15. An apparatus according to claim 14, wherein the data stored in said storage means is compressed data obtained by deleting a redundancy component on the basis of a frequency component of the information and compressing an information volume of the data.

16. An apparatus according to claim 15, wherein the data stored in said storage means is data in which the information volume is compressed by a Discrete Cosine Transform.

17. An apparatus according to claim 15, wherein the predetermined component range is of Discrete Cosine components.

18. An apparatus according to claim 14, wherein said storage means adds a keyword to each data and stores the data with the keyword, and said apparatus further comprises pre-extraction means for narrowing a range of processing target data for said pattern-matching means in accordance with keyword retrieval based on an input keyword.

19. An apparatus according to claim 14, further comprising second generation means for generating keywords in a plurality of degrees of abstraction with respect to the input keyword.

20. An apparatus according to claim 14, wherein the data is image data.

21. An apparatus according to claim 14, wherein the data serving as the retrieval key is compressed and stored in a same technique as that of the data stored in said storage means.

22. An information processing method of an information processing apparatus, which comprises storage means for storing a plurality of retrieval object pattern data, comprising:

a generation step of generating reference pattern data on the basis of a data retrieval key;

a pattern-matching step of pattern-matching between each of the plurality of retrieval object pattern data stored in the storage means and the reference pattern data: and an extraction step of extracting the retrieval object pattern data matched with the reference pattern data by said pattern-matching step.

23. An information processing method comprising:

the read step of reading out a plurality of compressed retrieval object pattern data from storage means;

the generation step of generating reference pattern data using data of all compressed data, which belongs to a predetermined component range, all the compressed data being obtained by compressing data serving as a data retrieval key in a same technique as that of the compressed data read out in the read step;

the pattern-matching step of pattern-matching between each of the plurality of retrieval object pattern data read out in said read step and the reference pattern data: and the extraction step of extracting the retrieval object pattern data matched with the reference pattern data in said pattern-matching step.

24. An information processing method comprising:

the read step of reading out a plurality of compressed retrieval object pattern data from storage means;

the holding step of holding a retrieval keyword in a plurality of degrees of abstraction;

the selection step of selecting data serving as a data retrieval key on the basis of a keyword of the keywords held in the holding step, which has a predetermined degree of abstraction;

the generation step of generating reference pattern data using data of all compressed data, which belongs to the predetermined component range, all the compressed data being obtained such that the data selected in the selection step is compressed in a same technique as that of the compressed data read out in the read step;

the pattern-matching step of pattern-matching between each of the retrieval object pattern data read out in the read step, which belongs to the predetermined component range, and the reference pattern data;

the extraction step of extracting the retrieval object pattern data matched with the reference pattern data; and the control step of employing a keyword of lower degree of abstraction as the keyword for use in the selection step to widen a component range in the generation step, and re-executing the selection step, the generation step, and the extraction step using, as processing target data, the retrieval object pattern data extracted in the extraction step.

25. An information processing system comprising:

a storage apparatus for storing a plurality of retrieval object pattern data, an information processing apparatus, and a connection apparatus for connecting said storage apparatus and said information processing apparatus, wherein said information processing apparatus comprises:

generation means for generating reference pattern data on the basis of a data retrieval key;

pattern-matching means for pattern-matching between each of the plurality of retrieval object pattern data stored in said storage apparatus and the reference pattern data; and extraction means for extracting the retrieval object pattern data matched with the reference pattern data by said pattern-matching means.

26. A system according to claim 25, wherein the data stored in said storage apparatus is compressed data obtained by deleting a redundancy component on the basis of a frequency component of the information and compressing an information volume of the data.

27. A system according to claim 26, wherein the data stored in said storage apparatus is data in which the information volume is compressed by a Discrete Cosine Transform.

28. A system according to claim 26, wherein said pattern-matching means pattern-matches the reference pattern data with all the data stored in said storage apparatus, which belongs to a predetermined component range, and said extraction means extracts data on the basis of a pattern-matching result.

29. A system according to claim 28, wherein the predetermined component range is of Discrete Cosine components.

30. A system according to claim 25, wherein said storage apparatus adds a keyword to each data and stores the data with the keyword, and said information processing apparatus further comprises pre-extraction means for narrowing a range of processing target data for said pattern-matching means in accordance with keyword retrieval based on an input keyword.

31. A system according to claim 30, wherein said information processing apparatus further comprises second generation means for generating a keyword of superordinate concept of the input keyword, and said pre-extraction processing means performs keyword retrieval on the basis of the keyword of superordinate concept generated by said second generation means and narrows the range of processing target data for said pattern-matching means.

32. An information processing system comprising a storage apparatus for storing a plurality of retrieval object pattern data, an information processing apparatus, and a connection apparatus for connecting said storage apparatus and said information processing apparatus, wherein said information processing apparatus comprises:

first generation means for generating reference pattern data which belongs to a predetermined component range, on the basis of a data retrieval key;

first pattern-matching means for pattern-matching between each of the plurality of retrieval object pattern data stored in said storage apparatus, which belongs to said predetermined component range, and the reference pattern data;

first extraction means for extracting the retrieval object pattern data matched with the reference pattern data by said first pattern-matching means:

widening means for widening said predetermined component range;

second generation means for generating new reference pattern data which belongs to the component range widened by said widening means;

second pattern-matching means for pattern-matching between each of the retrieval object pattern data extracted by said first extraction means which belongs to said widened component range and the new reference pattern data; and second extraction means for extracting the retrieval object pattern data matched with the new reference pattern data by said second pattern-matching means.

33. A system according to claim 32, wherein said information processing apparatus further comprises decision means for determining whether data extraction by said first extraction means is executed with a desired accuracy, and deciding on the basis of a determination result whether said second generation means and said extraction means execute operations.

34. A system according to claim 32, wherein the data stored in said storage apparatus is compressed data obtained by deleting a redundancy component on the basis of a frequency component of the information and compressing an information volume of the data, and said widening means widens said component range from a Discrete Cosine component to a high frequency component.

35. An information processing apparatus comprising a storage apparatus for storing a plurality of information-compressed retrieval object pattern data, an information Processing apparatus, and a connection apparatus for connecting said storage apparatus and said information processing apparatus, wherein said information processing apparatus comprises:

holding means for holding retrieval keywords in a plurality of degrees of abstraction;

selection means for selecting data serving as a data retrieval key on the basis of one of all the keywords held in said holding means, which has a predetermined degree of abstraction;

generation means for generating reference pattern data using data of all compressed data, which belongs to the predetermined component range, all the compressed data being obtained by compressing the data selected by said selection means using a same technique as that of the compressed data stored in said storage apparatus;

reception means for receiving each compressed data stored in said storage apparatus through said connection apparatus;

pattern-matching means for pattern-matching between each of the retrieval object pattern data stored in said storage apparatus, which belongs to the predetermined component range, and the reference pattern data;

extraction means for extracting the retrieval object pattern data matched with the reference pattern data; and control means for using a keyword having a lower degree of abstraction as a keyword for use in said selection means, widening a component range in said generation means, and causing said selection means, said generation means, and said extraction means to process the retrieval object pattern data, as processing target data, extracted by said extraction means.

36. A system according to claim 35, wherein the data stored in said storage apparatus is compressed data obtained by deleting a redundancy component on the basis of a frequency component of the information and compressing an information volume of the data.

37. A system according to claim 36, wherein the data stored in said storage apparatus is data in which the information volume is compressed by a Discrete Cosine Transform.

38. A system according to claim 36, wherein the predetermined component range is of Discrete Cosine components.

39. A system according to claim 35, wherein said storage apparatus adds a keyword to each data and stores the data with the keyword, and said information processing apparatus further comprises pre-extraction means for narrowing a range of processing target data for said pattern-matching means in accordance with keyword retrieval based on an input keyword.

40. A system according to claim 35, wherein said information processing apparatus comprises second generation means for generating keywords in a plurality of degrees of abstraction with respect to the input keyword.

41. A system according to claim 35, wherein the data is image data.

42. A system according to claim 35, wherein the data serving as the retrieval key is compressed and stored in a same technique as that of the data stored in said storage apparatus.

43. A computer-readable storage medium having stored therein a program for causing an information processing apparatus, which comprises storage means for storing a plurality of retrieval object pattern data, to execute a method, said method comprising:

a generation step of generating reference pattern data on the basis of a data retrieval key;

a pattern-matching step of pattern-matching between each of the plurality of retrieval object pattern data stored in the storage means and the reference pattern data; and an extraction step of extracting the retrieval object pattern data matched with the reference pattern data by said pattern-matching step.

44. A computer-readable storage medium having stored therein a program for causing an information processing apparatus, which comprises storage means for storing a plurality of retrieval object pattern data, to execute a method, said method comprising:

the read step of reading out a plurality of compressed retrieval object pattern data from storage means;

the generation step of generating reference pattern data using data of all compressed data, which belongs to a predetermined component range, all the compressed data being obtained by compressing data serving as a data retrieval key in a same technique as that of the compressed data read out in the read step;

the pattern-matching step of pattern-matching between each of the plurality of retrieval object pattern data read out in said read step and the reference pattern data; and the extraction step of extracting the retrieval object pattern data matched with the reference pattern data in said pattern-matching step.

45. A computer-readable storage medium having stored therein a program for causing an information processing apparatus, which comprises storage means for storing a plurality of retrieval object pattern data, to execute a method, said method comprising:

the read step of reading out a plurality of compressed retrieval object pattern data from storage means;

the holding step of holding a retrieval keyword in a plurality of degrees of abstraction;

the selection step of selecting data serving as a data retrieval key on the basis of a keyword of the keywords held in the holding step, which has a predetermined degree of abstraction;

the generation step of generating reference pattern data using data of all compressed data, which belongs to the predetermined component range, all the compressed data being obtained such that the data selected in the selection step is compressed in a same technique as that of the compressed data read out in the read step;

the pattern-matching step of pattern-matching between each of the retrieval object pattern data read out in the read step, which belongs to the predetermined component range, and the reference pattern data;

the extraction step of extracting the retrieval object pattern data matched with the reference pattern data; and the control step of employing a keyword of lower degree of abstraction as the keyword for use in the selection step to widen a component range in the generation step, and re-executing the selection step, the generation step, and the extraction step using, as processing target data, the retrieval object pattern data extracted in the extraction step.

46. An information processing apparatus comprising:

generation means for generating reference pattern data on the basis of a data retrieval key;

pattern-matching means for pattern-matching between each of a plurality of retrieval object pattern data stored in a storage means and the reference pattern data; and extraction means responsive to said pattern-matching means for extracting any of the plurality of retrieval object pattern data that pattern-matches with the reference pattern data.

47. An information processing apparatus comprising:

generation means for generating reference pattern data;

pattern-matching means for pattern-matching between each of a plurality of retrieval object pattern data stored in a storage means and the reference pattern data; and extraction means responsive to said pattern-matching means for extracting any of the plurality of retrieval object pattern data that pattern-matches with the reference pattern data.

48. An information processing apparatus comprising:

pattern-matching means for pattern-matching between each of a plurality of retrieval object pattern data stored in a storage means and reference pattern data; and extraction means responsive to said pattern-matching means for extracting any of the plurality of retrieval object pattern data that pattern-matches with the reference pattern data.

49. An information processing apparatus comprising:

first extraction means for extracting desired reference pattern data from a first storage means;

compression means for compressing information of the reference pattern data to provide compressed information;

pattern-matching means for pattern-matching each of a plurality of retrieval object pattern data stored in a second storage means based on the compressed information; and second extraction means responsive to said pattern-matching means for extracting any of the plurality of retrieval object pattern data that pattern-matches based on the compressed information.

50. An information processing method comprising the steps of:

generating reference pattern data;

pattern-matching between each of a plurality of retrieval object pattern data stored in a storage means and the reference pattern data; and extracting, responsive to said pattern-matching step, any of the plurality of retrieval object pattern data that pattern-matches with the reference pattern data.

* * * * *

UNITED STATES PATENT AND TRADEMARK OFFICE
CERTIFICATE OF CORRECTION

PATENT NO.   :   5,940,824
DATED        :   August 17, 1999
INVENTOR(S)  :   KOJI TAKAHASHI It is certified that error appears in the above-identified patent and that said Letters Patent is hereby corrected as shown below:

In the drawings:

SHEET 1

FIG. 1, "RETRIEVRL" should read --RETRIEVAL--.

COLUMN 1

Line 31, "are" should read --is--.

COLUMN 2

Line 16, "mans" should read --means--.

COLUMN 8

Line 21, "m=1" should read --m=1).--.

COLUMN 15

Line 45, "Pattern-matching" should read --pattern-matching--.

UNITED STATES PATENT AND TRADEMARK OFFICE
CERTIFICATE OF CORRECTION

PATENT NO. : 5,940,824

DATED : August 17, 1999

INVENTOR(S) : KOJI TAKAHASHI

It is certified that error appears in the above-identified patent and that said Letters Patent is hereby corrected as shown below:

<u>COLUMN 19</u>

Line 17, "Processing" should read --processing--.

Signed and Sealed this

Twentieth Day of June, 2000

Q. TODD DICKINSON

*Attest:*

*Attesting Officer*      *Director of Patents and Trademarks*